(12) United States Patent
van Vooren et al.

(10) Patent No.: US 9,992,924 B2
(45) Date of Patent: Jun. 12, 2018

(54) FOLDING MECHANISM FOR WIDE WHEAT HEADERS

(71) Applicant: CNH Industrial America LLC, New Holland, PA (US)

(72) Inventors: Sandor van Vooren, Sijsele-Damme (BE); Siegfried Vandergucht, Reninge (BE); Yvan C. C. Vandergucht, Lo-Reninge (BE)

(73) Assignee: CNH Industrial America LLC, New Holland, PA (US)

( * ) Notice: Subject to any disclaimer, the term of this patent is extended or adjusted under 35 U.S.C. 154(b) by 29 days.

(21) Appl. No.: 15/067,464

(22) Filed: Mar. 11, 2016

(65) Prior Publication Data
US 2016/0262301 A1 Sep. 15, 2016

(30) Foreign Application Priority Data
Mar. 13, 2015 (BE) .................................. 2015/5145

(51) Int. Cl.
*A01B 63/00* (2006.01)
*A01B 73/06* (2006.01)
*A01D 41/14* (2006.01)

(52) U.S. Cl.
CPC ............ *A01B 73/06* (2013.01); *A01D 41/144* (2013.01)

(58) Field of Classification Search
CPC ...... A01D 41/144; A01D 41/14; A01B 73/02; A01B 73/044; A01B 73/046
USPC .................................................. 172/311, 456
See application file for complete search history.

(56) References Cited

U.S. PATENT DOCUMENTS

| | | | | |
|---|---|---|---|---|
| 3,258,901 A | * | 7/1966 | Van Der Lely | A01D 41/14 56/2 |
| 3,262,254 A | * | 7/1966 | Van Der Lely | A01D 34/03 172/456 |
| 3,345,808 A | * | 10/1967 | Van Der Lely | A01D 34/246 56/10.2 R |
| 3,468,107 A | * | 9/1969 | Van Der Lely | A01D 41/144 56/11.9 |
| 3,540,195 A | * | 11/1970 | Van Der Lely | A01D 57/30 56/10.7 |
| 3,683,601 A | * | 8/1972 | Van der Lely | A01D 41/144 56/6 |
| 4,030,551 A | | 6/1977 | Boetto et al. | |
| 4,232,747 A | * | 11/1980 | Pfenninger | A01B 73/044 172/311 |
| 4,409,780 A | | 10/1983 | Beougher et al. | |

(Continued)

FOREIGN PATENT DOCUMENTS

| DE | 4030066 A1 | 3/1992 |
|---|---|---|
| EP | 3789990 A1 | 8/1997 |

(Continued)

*Primary Examiner* — Arpad Fabian-Kovacs
(74) *Attorney, Agent, or Firm* — Peter K. Zacharias; Patrick M. Sheldrake

(57) ABSTRACT

An agricultural harvester includes a chassis and a foldable header for cutting and gathering crop material, the foldable header being carried by the chassis. The foldable header includes a center header frame and at least one wing header frame. The at least one wing header frame is connected to the center header frame by at least one parallel folding mechanism, which includes a lower parallel beam and an upper parallel hydraulic piston substantially parallel to the lower parallel beam.

10 Claims, 6 Drawing Sheets

(56) References Cited

U.S. PATENT DOCUMENTS

| | | | |
|---|---|---|---|
| 4,487,004 A | 12/1984 | Kejr | |
| 4,690,260 A * | 9/1987 | Landphair | A01B 73/065 111/55 |
| 4,903,470 A * | 2/1990 | Hemker | A01D 41/144 172/311 |
| 5,577,563 A * | 11/1996 | Holen | A01B 73/044 111/57 |
| 5,673,543 A * | 10/1997 | Richardson | A01D 41/144 56/228 |
| 5,724,798 A * | 3/1998 | Stefl | A01D 41/144 172/311 |
| 5,845,472 A * | 12/1998 | Arnold | A01D 41/144 56/228 |
| 5,911,625 A * | 6/1999 | von Allworden | A01D 41/144 460/119 |
| 6,675,568 B2 * | 1/2004 | Patterson | A01D 41/14 56/208 |
| 7,043,889 B2 * | 5/2006 | Rauch | A01D 41/144 56/15.9 |
| 7,360,351 B2 * | 4/2008 | Rickert | A01D 41/144 56/228 |
| 7,404,283 B2 * | 7/2008 | Viaud | A01D 41/148 56/15.5 |
| 7,610,741 B2 * | 11/2009 | Halter | A01D 57/20 56/228 |
| 8,091,331 B2 * | 1/2012 | Dow | A01B 73/02 56/192 |
| 9,173,345 B2 * | 11/2015 | Cressoni | A01D 41/144 |
| 2002/0035826 A1 * | 3/2002 | Albinger | A01D 41/144 56/109 |
| 2003/0041579 A1 * | 3/2003 | Wuebbels | A01D 41/144 56/15.2 |
| 2003/0182912 A1 * | 10/2003 | Boll | A01D 34/661 56/14.7 |
| 2003/0226342 A1 * | 12/2003 | Boeckmann | A01D 45/021 56/14.7 |
| 2004/0123575 A1 * | 7/2004 | Rickert | A01D 41/144 56/14.7 |
| 2005/0109001 A1 * | 5/2005 | Wolters | A01D 57/22 56/16.4 R |
| 2006/0248870 A1 * | 11/2006 | Geiser | A01D 84/00 56/344 |
| 2006/0254240 A1 * | 11/2006 | Krone | A01D 43/083 56/16.6 |
| 2007/0204583 A1 * | 9/2007 | Coers | A01D 61/002 56/14.4 |
| 2008/0072560 A1 * | 3/2008 | Talbot | A01D 41/14 56/208 |
| 2008/0295473 A1 * | 12/2008 | Tippery | A01D 41/144 56/14.5 |

FOREIGN PATENT DOCUMENTS

| | | |
|---|---|---|
| EP | 1166616 A1 | 1/2002 |
| EP | 1169906 A1 | 1/2002 |
| EP | 1932414 A1 | 6/2008 |
| GB | 1275492 A | 5/1972 |

* cited by examiner

FOLDING MECHANISM FOR WIDE WHEAT HEADERS

This application claims priority to Belgium Application BE2015/5145 filed Mar. 13, 2015, which is incorporated herein by reference in its entirety.

BACKGROUND OF THE INVENTION

The present invention relates to agricultural harvesters, and more specifically to foldable headers of harvesters.

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger.

The clean grain auger conveys the grain to a grain tank for temporary storage. The grain accumulates to the point where the grain tank is full and is discharged to an adjacent vehicle such as a semi trailer, gravity box, straight truck or the like by an unloading system on the combine that is actuated to transfer grain into the vehicle.

The crop gathering capability of the combine is directly dependent upon the width of the header, since the width defines that amount of crop that the combine encounters as the combine moves forward across a field. Flexibility can provide advantages to a header of significant width in dealing with ground contours. Further, in order to meet width limitations, it is often required to remove the header entirely from the combine while it is being transported on roads.

What is needed in the art is an effective way to provide a wide header capable of flexibility and articulation while in a working mode, and capable of folding to a compact configuration when in a transport mode.

SUMMARY OF THE INVENTION

The present invention provides for a header for use with an agricultural harvester that is capable of flexibility and articulation while in a working mode, and capable of folding to a compact configuration when in a transport mode.

The invention in one form is directed to an agricultural harvester including a chassis and a foldable header for severing and gathering crop material, the foldable header being carried by the chassis. The foldable header includes a center header frame and at least one wing header frame. The at least one wing header frame is connected to the center header frame by at least one parallel folding mechanism, which includes a lower parallel beam and an upper parallel hydraulic piston substantially parallel to the lower parallel beam.

An advantage of the present invention is that the foldable header is capable of folding to a compact configuration when in a transport mode, while being capable of flexibility and articulation while in a working mode.

Another advantage is that, in an embodiment including detachable hinges cooperating with the at least one parallel folding mechanism, the detachable hinges provide greater lateral rigidity while providing for vertical flexibility and articulation in the working mode, and retaining the ability to fold to a compact configuration in the transport mode.

Another advantage is that the foldable header allows the use of rotatable reel sections and auger sections of consistent diameter.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
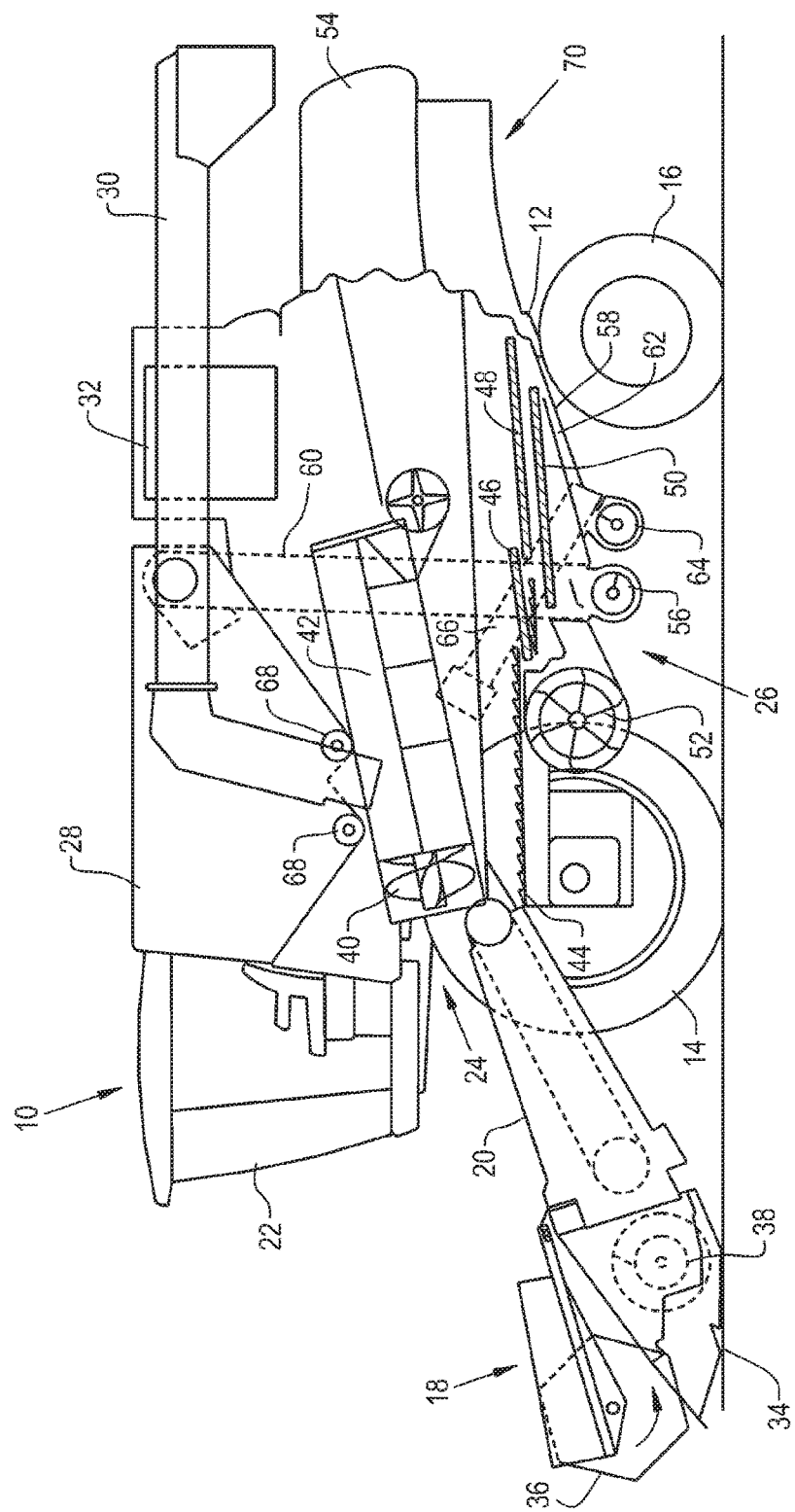
FIG. 1 is a side view of an embodiment of an agricultural harvester in the form of a combine.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading conveyance 30. Unloading conveyor 30 is illustrated as an unloading auger, but can also be configured as a belt conveyor, chain elevator, etc.

The front wheels 14 are larger flotation type wheels, and the rear wheels 16 are smaller steerable wheels. Motive force is selectively applied to the front wheels 14 through a power plant in the form of a diesel engine 32 and a transmission (not shown). Although the combine 10 is shown as including wheels, is also to be understood that the combine 10 may include tracks, such as full tracks or half tracks.

The header 18 is mounted to the front of the combine 10 and includes a cutter bar 34 for severing crops from a field during forward motion of the combine 10. A rotatable reel 36 feeds the crop into the header 18, and an auger 38 feeds the severed crop laterally inwardly from each side toward the feeder housing 20. The feeder housing 20 conveys the cut crop to the threshing and separating system 24, and is selectively vertically movable using appropriate actuators, such as hydraulic cylinders (not shown).

The threshing and separating system 24 is of the axial-flow type, and generally includes a rotor 40 at least partially enclosed by and rotatable within a corresponding perforated concave 42. The cut crops are threshed and separated by the rotation of the rotor 40 within the concave 42, and larger elements, such as stalks, leaves and the like are discharged from the rear of the combine 10. Smaller elements of crop material including grain and non-grain crop material, including particles lighter than grain, such as chaff, dust and straw, are discharged through perforations of the concave 42. Although the threshing and separating system 24 is illustrated as being of an axial-flow type having a rotor, it is also contemplated to use the present invention with other conventional threshing systems.

Grain which has been separated by the threshing and separating assembly 24 falls onto a grain pan 44 and is conveyed toward the cleaning system 26. The cleaning system 26 may include an optional pre-cleaning sieve 46, an upper sieve 48 (also known as a chaffer sieve), a lower sieve 50 (also known as a cleaning sieve), and a cleaning fan 52. Grain on the sieves 46, 48 and 50 is subjected to a cleaning action by the fan 52 which provides an airflow through the sieves to remove chaff and other impurities such as dust from the grain by making this material airborne for discharge from the straw hood 54 of the combine 10. The grain pan 44 and the pre-cleaning sieve 46 oscillate in a fore-to-aft manner to transport the grain and finer non-grain crop material to the upper surface of the upper sieve 48. The upper sieve 48 and the lower sieve 50 are vertically arranged relative to each other, and likewise oscillate in a fore-to-aft manner to spread the grain across the sieves 48, 50, while permitting the passage of cleaned grain by gravity through the openings of the sieves 48, 50.

Clean grain falls to a clean grain auger 56 positioned crosswise below and in front of the lower sieve 50. The clean grain auger 56 receives clean grain from each sieve 48, 50 and from the bottom pan 58 of the cleaning system 26. The clean grain auger 56 conveys the clean grain laterally to a generally vertically arranged grain elevator 60 for transport to the grain tank 28. Tailings from the cleaning system 26 fall to a tailings auger trough 62. The tailings are transported via the tailings auger 64 and the return auger 66 to the upstream end of the cleaning system 26 for repeated cleaning action. The cross augers 68 at the bottom of the grain tank 28 convey the clean grain within the grain tank 28 to the unloading auger 30 for discharge from the combine 10.

The non-grain crop material proceeds through a residue handling system 70. The residue handling system 70 may include a chopper, counter knives, a windrow door and a residue spreader.

Figure 2:
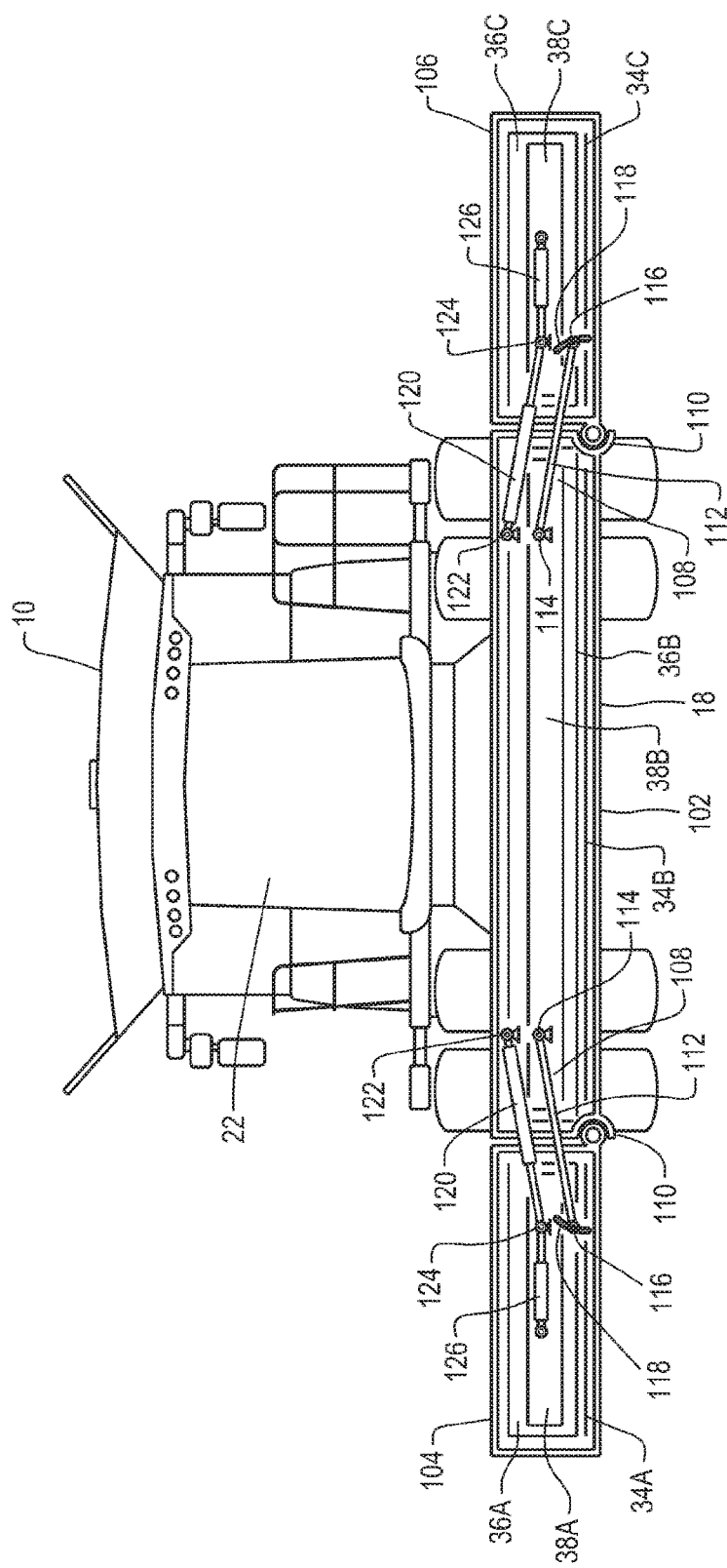
FIG. 2 is a front view of the agricultural harvester of FIG. 1 with an embodiment of a foldable header with a folding mechanism of the present invention, in a working mode.

Now, additionally referring to FIG. 2, there is shown and illustrated a combine 10 having an operator cab 22 and a foldable header 18 according to a first embodiment of the present invention. The foldable header 18 is generally divided into a center header frame 102, a right hand wing header frame 104, and a left hand wing header frame 106. The foldable header 18 is illustrated in simplified representation, and not to scale, such that various lengths of center header frame 102, right hand wing header frame 104, and left hand wing header frame 106 are contemplated, including at least 25 foot center header frame 102 and 10 foot right hand wing header frame 104 and left hand wing header frame 106 for a foldable header 18 with an overall length of 45 feet, and 40 foot center header frame 102 and 10 foot right hand wing header frame 104 and left hand wing header frame 106 for a foldable header 18 with an overall length of 60 feet. The right hand wing header frame 104 has a right cutter bar 34A, a right rotatable reel 36A, and a right auger 38A, each shown partially cut away in order to show the parallel folding mechanisms 108 behind them. The left hand wing header frame 106 has a left cutter bar 34C, a left rotatable reel 36C, and a left auger 38C, also each shown partially cut away in order to show the parallel folding mechanisms 108 behind them. The center header frame 102 has a center cutter bar 34B, a center rotatable reel 36B, and a center auger 38B, also each shown partially cut away in order to show the parallel folding mechanisms 108 behind them.

At the lower outer corners of the center header frame 102 and at the lower inner corners of the right hand wing header frame 104 and the left hand wing header frame 106 are provided mating portions of detachable hinges 110. Further provided are parallel folding mechanisms 108, which include lower parallel square beams 112 having lower parallel square beam inner pivots 114 and lower parallel square beam outer pivots 116, and upper parallel hydraulic pistons 120 having upper parallel hydraulic piston inner pivots 122 and upper parallel hydraulic piston outer pivots 124. The lower parallel square beam outer pivots 116 ride along gliding rails 118, and the upper parallel hydraulic piston outer pivots 124 attach to a top shaft horizontal adjusting mechanism 126.

Figure 3:
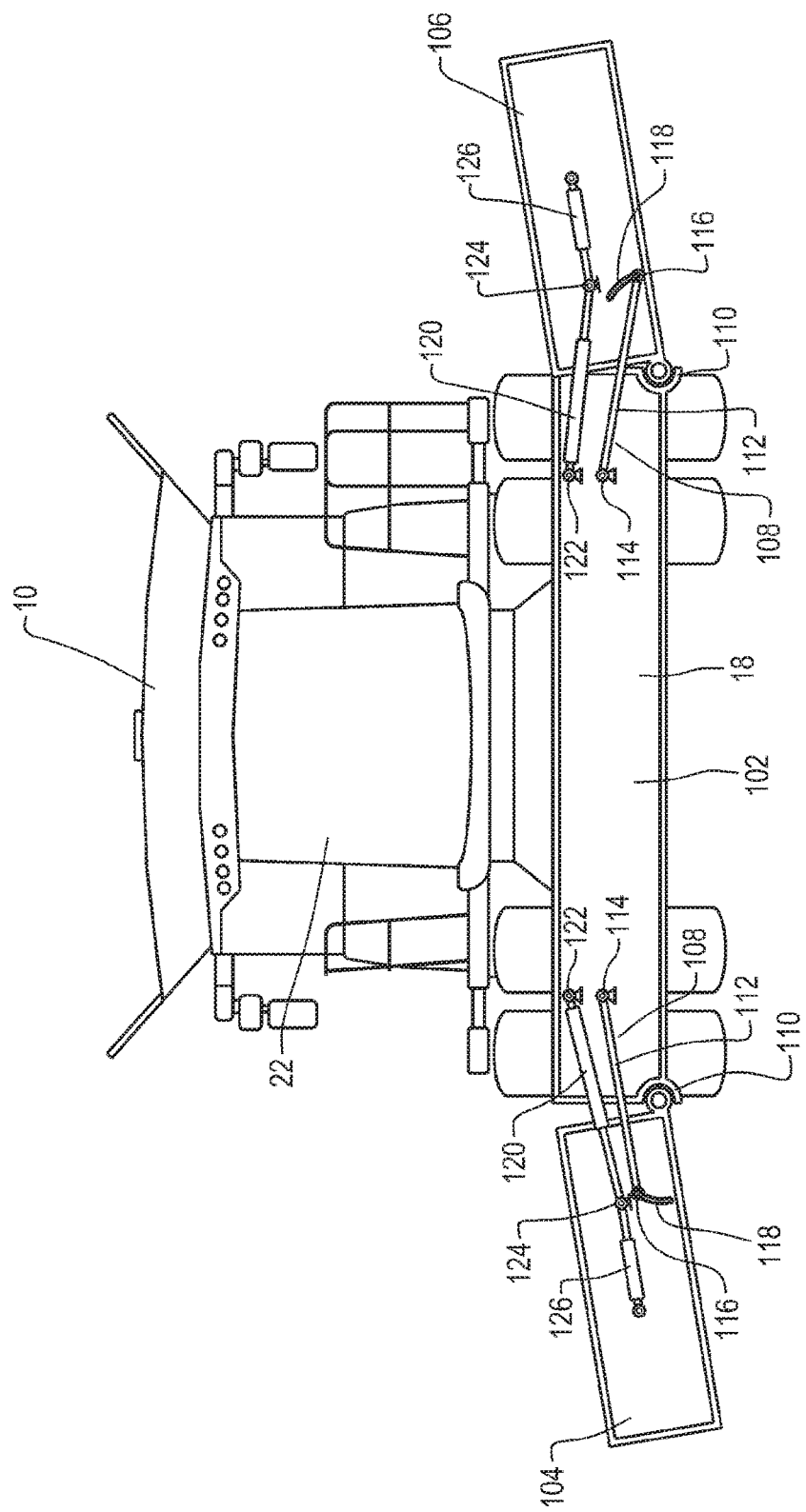
FIG. 3 is a front view of the embodiment of a foldable header with a folding mechanism of the present invention of FIG. 2, showing the wing headers floating up and down to accommodate variations in terrain.

The foldable header 18 in FIG. 2 is shown in an operating mode, during which the right hand wing header frame 104 and left hand wing header frame 106 are engaged to the center header frame 102 by way of the detachable hinges 110, which may be so configured as to lock the right hand wing header frame 104 and left hand wing header frame 106 to the center header frame 102 while allowing them to pivot about the longitudinal axis of the detachable hinges 110. Turning to FIG. 3, there is shown the way in which this first embodiment of the present invention allows the foldable header 18 to articulate in order to conform to ground terrain contours.

FIG. 3 again shows the combine 10 having an operator cab 22 and a foldable header 18 divided into a center header frame 102, a right hand wing header frame 104, and a left hand wing header frame 106, according to the first embodiment of the present invention. The right hand wing header frame 104 and the left hand wing header frame 106 are again retained in pivoting attachment to the center header frame 102 by the detachable hinges 110. For illustrative clarity, the cutter bars 34A, 34B, 34C, the rotatable reels 36A, 36B, 36C, and the augers 38A, 38B, 38B are omitted. As the right hand wing header frame 104 and the left hand wing header frame 106 articulate up and down, the upper parallel hydraulic pistons 120 change in length between upper parallel hydraulic piston inner pivots 122 and upper parallel hydraulic piston outer pivots 124, and may operate in a "float" configuration wherein extending pressure is applied while such movement is accommodated. Top shaft horizontal adjusting mechanisms 126 remain essentially fixed. Meanwhile, lower parallel square beam outer pivots 116 of lower parallel square beams 112 are allowed to move freely along the length of gliding rails 118, in order to accommodate right hand wing header frame 104 and the left hand wing header frame 106 articulating up and down.

Figure 4:
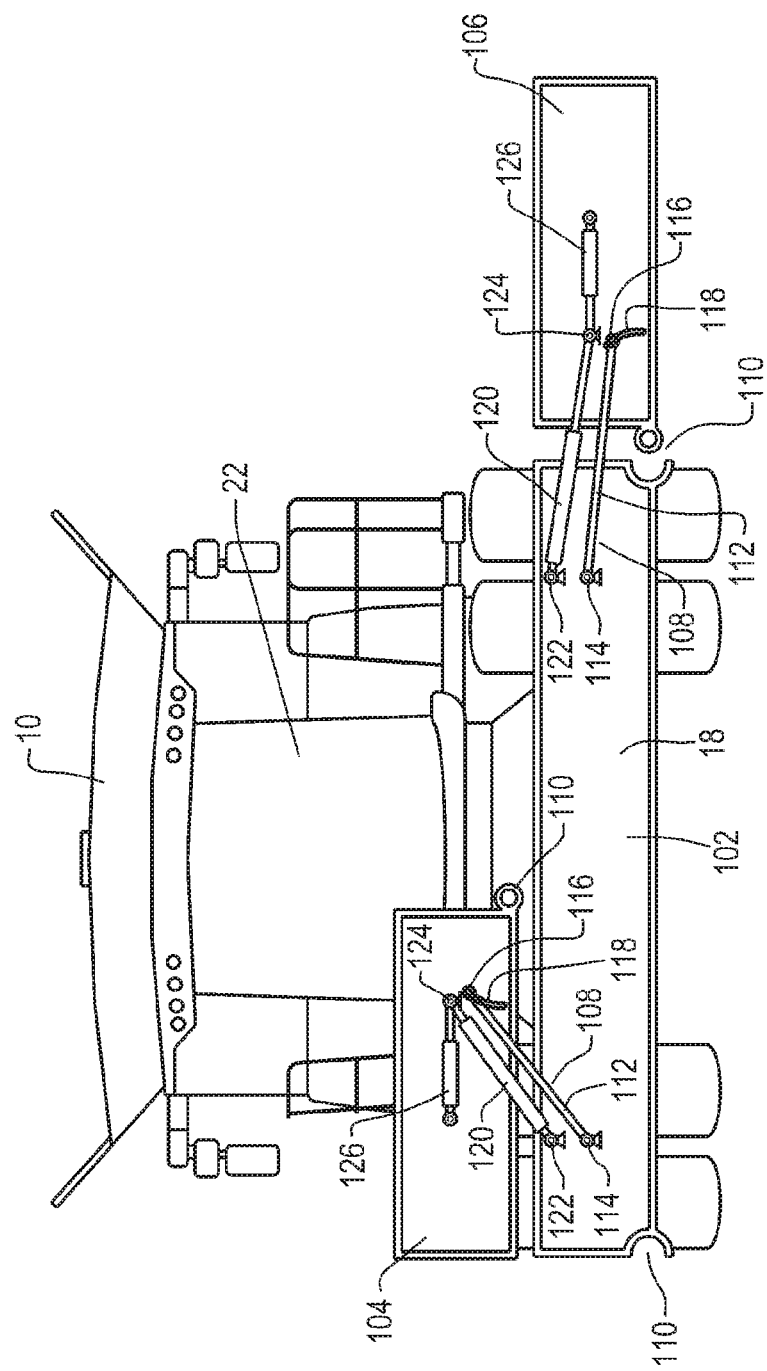
FIG. 4 is a front view of the embodiment of a foldable header with a folding mechanism of the present invention of FIGS. 2 and 3, showing the left hand wing header with the detachable hinge detached in preparation for folding to a transport mode, and the right hand wing header folded into a transport mode.

Turning now to FIG. 4, there is shown the way in which this first embodiment of the present invention is reconfigured from the operating mode to a transport mode. First, the detachable hinges 110 are allowed to detach the right hand wing header frame 104 and the left hand wing header frame 106 from the center header frame 102. The upper parallel hydraulic pistons 120 and the top shaft horizontal adjusting mechanisms 126 cooperate to move the right hand wing header frame 104 and the left hand wing header frame 106 outward from the center header frame 102. Then a lifting force is produced through lower parallel square beams 112, which may be produced by any of a number of common mechanisms, such as electric motors acting at lower parallel square beam inner pivots 114, hydraulic motors acting at lower parallel square beam inner pivots 114, or hydraulic cylinders acting upon lower parallel square beams 112 directly, or through a bell crank arrangement through lower parallel square beam inner pivots 114. As these mechanisms are common in the industry, they are not illustrated here. Lower parallel square beam outer pivots 116 are allowed to move to the upper end of gliding rails 118, retained there by gravity pulling downward on right hand wing header frame 104 and the left hand wing header frame 106 while they are being lifted. Alternately, lower parallel square beam outer pivots 116 may be actuated to move to a preferred location along the length of gliding rails 118 during the lifting operation. As shown with the right hand wing header frame 104, the parallel folding mechanisms 108 continue to articulate until the right hand wing header frame 104 and the left hand wing header frame 106 are located above the center header frame 102, thereby transitioning from the operating mode to the transport mode. During this process, it may be necessary for upper parallel hydraulic pistons 120 and the top shaft horizontal adjusting mechanisms 126 to move as needed in order to allow certain corners and protrusions of right hand wing header frame 104 and left hand wing header frame 106 to clear corners and protrusions of center header frame 102.

A second embodiment of the present invention is shown in FIGS. 5 and 6, again being a combine 10 having an operator cab 22 and a foldable header 18, which is generally divided into a center header frame 102, a right hand wing header frame 104, and a left hand wing header frame 106. For illustrative clarity, the cutter bars 34A, 34B, 34C, the rotatable reels 36A, 36B, 36C, and the augers 38A, 38B, 38B are omitted. In lieu of detachable hinges 110, the embodiment of the present invention shown in FIGS. 5 and 6 rely solely upon parallel folding mechanisms 108 for articulation in order to conform to ground terrain contours, as well as for transitioning from the operating mode to the transport mode and back again. Therefore, the parallel folding mechanisms 108 include lower parallel square beams 112 having lower parallel square beam inner pivots 114 and lower parallel square beam outer pivots 116, and upper parallel hydraulic pistons 120 having upper parallel hydraulic piston inner pivots 122 and upper parallel hydraulic piston outer pivots 124. The upper parallel hydraulic pistons 120 in this embodiment are attached to upper parallel telescoping square beams 128, in order to increase lateral rigidity.

Figure 5:
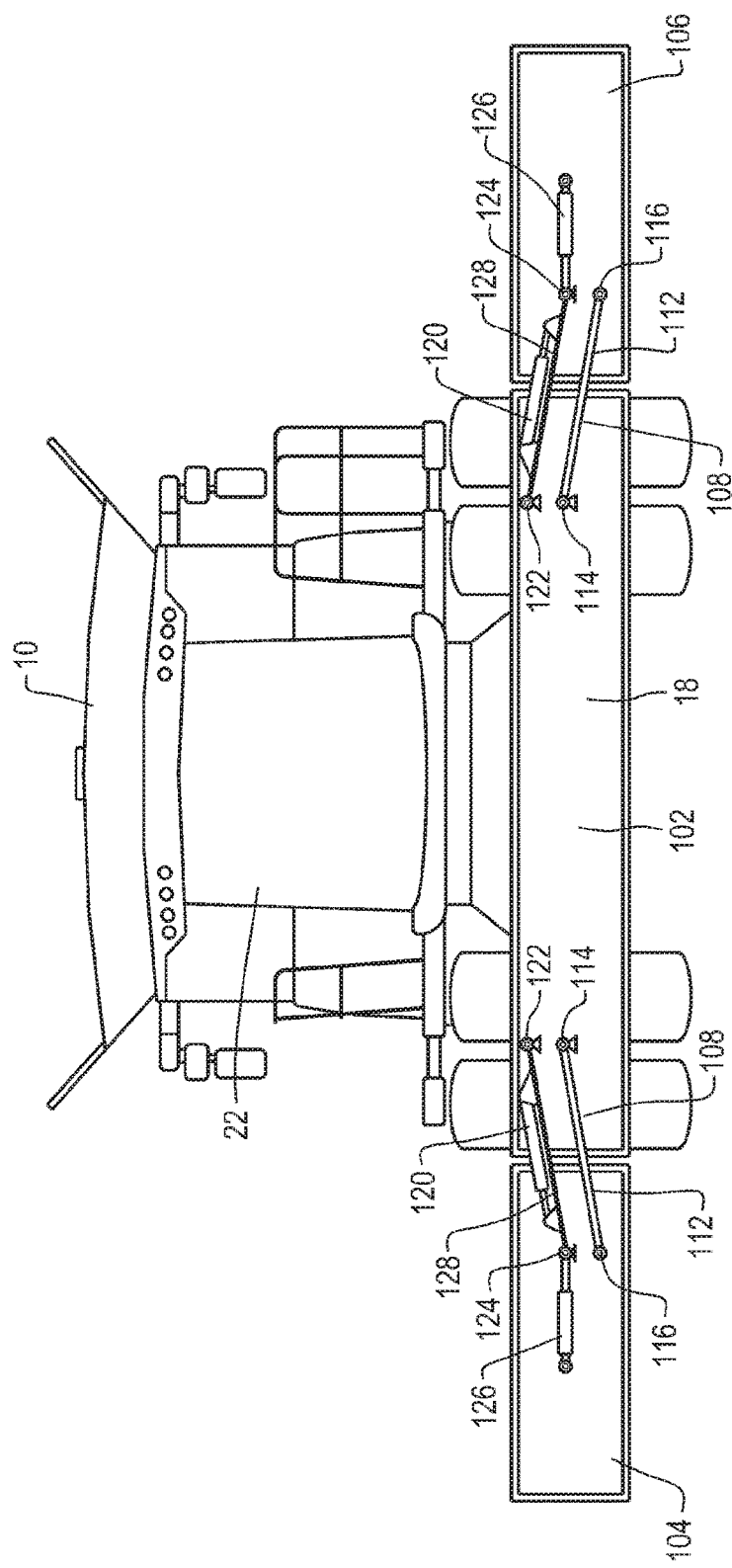
FIG. 5 is a front view of the harvester of FIG. 1 with a second embodiment of a foldable header with a folding mechanism of the present invention, in a working mode.
Figure 6:
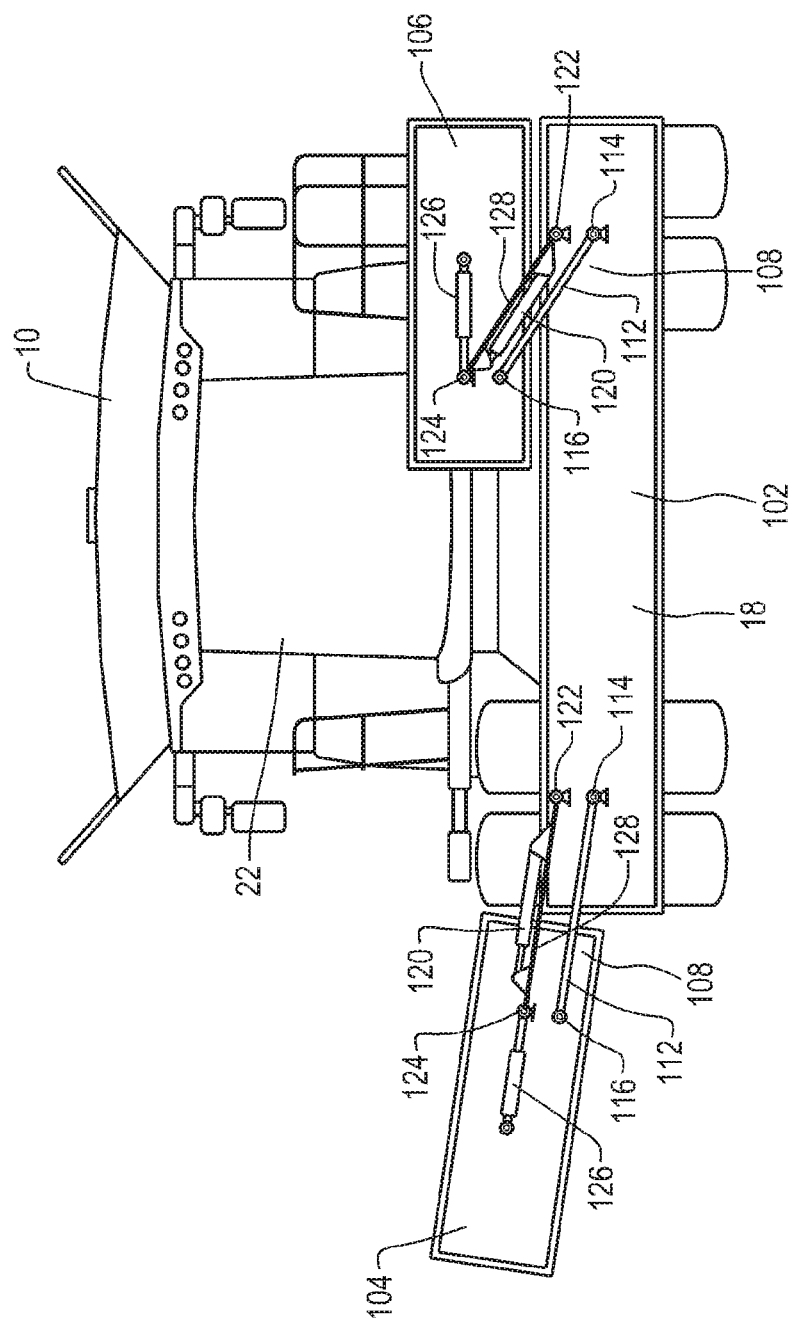
FIG. 6 is a front view of the second embodiment of a foldable header with a folding mechanism of the present invention of FIG. 5, showing the right hand wing header in process of folding to a transport mode, and the left hand wing header folded into a transport mode.

Similar to the first embodiment in FIGS. 2 through 4, the embodiment of the invention in FIGS. 5 and 6 are transitioned from the operating mode to the transport mode by way of a lifting force produced through one of lower parallel square beams 112 or upper parallel telescoping square beams 128, which may be produced by any of a number of common mechanisms, such as electric motors acting at inner pivots 114 or 122, hydraulic motors acting at inner pivots 114 or 122, or hydraulic cylinders acting upon lower parallel square beams 112 or upper parallel telescoping square beams 128 directly, or through a bell crank arrangement through inner pivots 114 or 122. Again, as these mechanisms are common in the industry, they are not illustrated here. As shown with the left hand wing header frame 106, the parallel folding mechanisms 108 continue to articulate until the right hand wing header frame 104 and the left hand wing header frame 106 are located above the center header frame 102, thereby transitioning from the operating mode to the transport mode. During this process, it may be necessary for upper parallel hydraulic pistons 120 and the top shaft horizontal adjusting mechanisms 126 to move as needed in order to allow certain corners and protrusions of right hand wing header frame 104 and left hand wing header frame 106 to clear corners and protrusions of center header frame 102.

In either of the first or second embodiments of the present invention, it is contemplated that each of the hydraulic systems, electric systems, and drive systems associated with each of the cutter bars 34A, 34B, 34C, the rotatable reels 36A, 36B, 36C, and the augers 38A, 38B, 38C are divided into center, left hand wing, and right hand wing portions. Such subdivided hydraulic systems, electric systems, and drive systems are known in the art as used on vertical folding corn headers, and therefore are not illustrated here.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An agricultural harvester, comprising:
   a chassis;
   a foldable header for severing and gathering crop material, the foldable header being carried by the chassis; wherein the foldable header comprises:
      a center header frame and at least one wing header frame; and
      at least one parallel folding mechanism having a lower parallel beam and an upper parallel hydraulic piston, the upper parallel hydraulic piston being substantially parallel to the lower parallel beam, the at least one parallel folding mechanism connecting the at least one wing header frame to the center header frame;
      a detachable hinge further releasably and pivotally connecting the at least one wing header frame to the center header frame; and
      a gliding rail connected to a lower parallel beam outer pivot of the lower parallel beam, the gliding rail and lower parallel beam outer pivot cooperating to allow the at least one wing header frame to pivot about the detachable hinge as the at least one wing header frame articulates in order to conform to ground terrain contours.

2. The agricultural harvester of claim 1, wherein the detachable hinge is substantially longitudinally oriented, and is located at a lower outer corner of the center header frame and a lower inner corner of the at least one wing header frame.

3. The agricultural harvester of claim 2, wherein the upper parallel hydraulic piston is operable in a float mode.

4. The agricultural harvester of claim 1, wherein the upper parallel hydraulic piston further comprises an upper parallel telescoping beam.

5. An agricultural harvester, comprising:
   a chassis; and
   a foldable header for severing and gathering crop material, the foldable header being carried by the chassis, said foldable header including:
      a center header frame and at least one wing header frame; and
      at least one parallel folding mechanism having a lower parallel beam and an upper parallel hydraulic piston, the upper parallel hydraulic piston being substantially parallel to the lower parallel beam, the at least one parallel folding mechanism connecting the at least one wing header frame to the center header frame, wherein the at least one parallel folding mechanism further comprises a top shaft horizontal adjusting mechanism connected to an upper parallel hydraulic piston outer pivot of the upper parallel hydraulic piston and to the at least one wing header frame.

6. The agricultural harvester according to claim 1, wherein the lower parallel beam is connected to the center header frame at a lower parallel beam inner pivot, and the lower parallel beam is pivotable about the lower parallel beam inner pivot for lifting the at least one wing header frame.

7. The agricultural harvester according to claim 1, wherein the at least one parallel folding mechanism is operable to reconfigure the foldable header from a working mode, with the at least one wing header frame in an articulating connection to the center header frame, to a transport mode, with the at least one wing header frame located generally above the center header frame.

8. The agricultural harvester according to claim 1, wherein the at least one wing header frame further comprises a left wing header frame and a right wing header frame.

9. The agricultural harvester according to claim 8, further comprising a center cutter bar, a center rotatable reel, and a center auger attached to the center header frame, a left cutter bar, a left rotatable reel, and a left auger attached to the left wing header frame, and a right cutter bar, a right rotatable reel, and a right auger attached to the right wing header frame.

10. A foldable agricultural header for severing and gathering crop material, comprising:
   a center header frame having a rear frame portion configured for connection with a feeder of a harvester;
   at least one wing header frame;
   at least one parallel folding mechanism having a lower parallel beam and an upper parallel hydraulic piston, the upper parallel hydraulic piston being substantially parallel to the lower parallel beam, the at least one parallel folding mechanism connecting the at least one wing header frame to the center header frame;
   a detachable hinge further releasably and pivotally connecting the at least one wing header frame to the center header frame; and
   a gliding rail connected to a lower parallel beam outer pivot of the lower parallel beam, the gliding rail and lower parallel beam outer pivot cooperating to allow the at least one wing header frame to pivot about the detachable hinge as the at least one wing header frame articulates in order to conform to ground terrain contours.

* * * * *